United States Patent
Gunter et al.

(10) Patent No.: US 12,292,808 B2
(45) Date of Patent: May 6, 2025

(54) APPARATUS AND METHOD FOR SIMULTANEOUSLY CLEARING AND INSTALLING DATA ON A PLURALITY OF COMPUTING DEVICES

(71) Applicant: Communications Test Design, Inc., West Chester, PA (US)

(72) Inventors: Austin Gunter, Lewisville, TX (US); Patrick Dameron, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 55 days.

(21) Appl. No.: 18/062,664

(22) Filed: Dec. 7, 2022

(65) Prior Publication Data

US 2024/0193059 A1    Jun. 13, 2024

(51) Int. Cl.
*G06F 11/273*  (2006.01)
*G06F 8/61*  (2018.01)

(52) U.S. Cl.
CPC .............. *G06F 11/273* (2013.01); *G06F 8/61* (2013.01)

(58) Field of Classification Search
CPC ................................. G06F 11/273; G06F 8/61
See application file for complete search history.

(56) References Cited

U.S. PATENT DOCUMENTS

| | | | | |
|---|---|---|---|---|
| 6,370,656 B1* | 4/2002 | Olarig | ................... | H04L 41/142 709/201 |
| 6,726,164 B1* | 4/2004 | Baiza | ..................... | G06F 1/181 248/222.12 |
| 7,703,091 B1* | 4/2010 | Martin | ..................... | G06F 8/61 717/172 |
| 8,561,053 B2* | 10/2013 | Barthram | .............. | H04L 67/306 717/171 |

(Continued)

FOREIGN PATENT DOCUMENTS

WO       2019152010 A1    8/2019

OTHER PUBLICATIONS

User Guide Secure Configuration Manager by NetIQ Jan. 2015 https://www.netiq.com/documentation/secure-configuration-manager-60/pdfdoc/scm_userguide/scm_userguide.pdf (Year: 2015).*

(Continued)

*Primary Examiner* — Joseph O Schell
(74) *Attorney, Agent, or Firm* — Bradley M. Brown (57) ABSTRACT

This application relates to apparatus and methods for simultaneously servicing a plurality of computing devices. In one example, a testing system includes a testing frame with a plurality of cabinets, each of the plurality of cabinets housing a computing device under test. Further, the testing frame includes a control cabinet housing a testing computing device, where the testing computing device is communicatively coupled, through one or more hubs located in one or more networking cabinets of the testing frame, to each of the plurality of computing devices under test. The testing frame (Continued)

may also include a bracket that secures a monitor and a keyboard, where the monitor and keyboard are communicatively coupled to the testing computing device. The testing computing device can simultaneously service the plurality of computing devices, such as by causing the deletion of user data, the loading of software, and the testing of various functions.

10 Claims, 6 Drawing Sheets

(56) References Cited

U.S. PATENT DOCUMENTS

| | | | | |
|---|---|---|---|---|
| 10,929,261 | B1* | 2/2021 | Levin | H04L 67/125 |
| 2005/0168926 | A1* | 8/2005 | Lee | G06F 1/16 |
| | | | | 361/679.06 |
| 2006/0272020 | A1* | 11/2006 | Gardner | G06F 21/575 |
| | | | | 726/25 |
| 2008/0183966 | A1* | 7/2008 | Shim | G11C 16/3495 |
| | | | | 711/E12.001 |
| 2010/0198937 | A1* | 8/2010 | Schletz | G06F 8/60 |
| | | | | 709/217 |
| 2010/0205421 | A1* | 8/2010 | Campbell | G06F 9/441 |
| | | | | 711/E12.001 |
| 2010/0328872 | A1* | 12/2010 | Chou | H05K 7/1494 |
| | | | | 248/220.21 |
| 2013/0167140 | A1* | 6/2013 | Androncik | G06F 8/61 |
| | | | | 717/177 |
| 2016/0301575 | A1* | 10/2016 | Jau | H04L 41/0869 |
| 2017/0126539 | A1 | 5/2017 | Tiwari et al. | |
| 2017/0257970 | A1* | 9/2017 | Alleman | G06F 1/20 |
| 2017/0277525 | A1* | 9/2017 | Czarnecki | H04L 41/0853 |
| 2018/0083854 | A1* | 3/2018 | Munjal | G06F 21/78 |
| 2019/0335033 | A1 | 10/2019 | Huang | |
| 2021/0011078 | A1* | 1/2021 | Chan | G01R 31/2868 |
| 2021/0067957 | A1 | 3/2021 | Parsons et al. | |
| 2021/0373904 | A1* | 12/2021 | Hudson | G06F 9/4416 |
| 2022/0102224 | A1 | 3/2022 | An et al. | |
| 2022/0374244 | A1* | 11/2022 | Wu | G06F 9/445 |
| 2023/0297465 | A1* | 9/2023 | Dattatraya Dixit | |
| | | | | G06F 11/0793 |
| | | | | 714/33 |

OTHER PUBLICATIONS

Wikipedia's 19-inch Rack historical version published Nov. 21, 2022 https://en.wikipedia.org/w/index.php?title=19-inch_rack&oldid=1123108842 (Year: 2022).*

Data centre design: Using engineered racks, pods and containers by Clive Longbottom published May 25, 2012 by ComputerWeekly.com https://www.computerweekly.com/tip/Data-centre-design-Using-engineered-racks-pods-and-containers (Year: 2012).*

International Search Report and Written Opinion issued for corresponding PCT International Application No. PCT/US2023/079374 dated Jun. 11, 2024, 15 pages.

* cited by examiner

APPARATUS AND METHOD FOR SIMULTANEOUSLY CLEARING AND INSTALLING DATA ON A PLURALITY OF COMPUTING DEVICES

TECHNICAL FIELD OF THE DISCLOSURE

The disclosed embodiments relate generally to apparatus and methods for testing computing devices, and more particularly, to clearing and installing data on computing devices.

BACKGROUND

Computing devices, such as personal computers, laptops, and tablets, among others, are widespread and employed for personal use as well as business use across a multitude of industries. These computing devices often require operating systems (OS) which can differ depending on the computing device. For example, Mac® computers may require a Mac® operating system (e.g., MacOS®), while personal computers (PCs) may require a Windows® operating system. Often times, computing devices must be tested and, in some examples, loaded with new software. For instance, before a customer purchases a new computing device, the new computing device may be loaded with software and tested. As another example, before refurbishing and reselling a computer, the computer may be tested and updated with more recent software. These processes, however, can be complicated, time consuming, and expensive.

SUMMARY

The embodiments are directed to apparatus and methods to simultaneously clear (i.e., delete) data from, and load software to, a plurality of computing devices, such as personal computers or laptops. The plurality of computing devices may differ, and may execute varying software (e.g., firmware, operating system (OS), etc.). The embodiments may also simultaneously perform functional tests on the plurality of computing devices. Further, the embodiments may determine results (e.g. status) of each of the plurality of computing devices, and may provide the results for display.

For example, in some embodiments, a testing system includes a testing frame with a plurality of cabinets, each of the plurality of cabinets housing a computing device under test. Further, the testing frame includes a control cabinet housing a testing computing device, where the testing computing device is communicatively coupled, through one or more hubs located in one or more networking cabinets of the testing frame, to each of the plurality of computing devices under test. The testing frame may also include a bracket that secures a monitor and a keyboard, where the monitor and keyboard are communicatively coupled to the testing computing device.

In some embodiments, a method by a testing computer includes transmitting a delete user data message to each of a plurality of computing devices, where the delete user data message causes each of the plurality of computing devices to delete user data. The method also includes transmitting a delete operating system message to each of the plurality of computing devices, where the delete operating system message causes each of the plurality of computing devices to delete a first operating system. Further, the method includes transmitting an operating system install message to each of the plurality of computing devices, where the operating system install message causes the each of the plurality of computing devices to install a second operating system. The method may include determining a status of each of the plurality of computing devices based on the install of the second operating system, and providing the status for display.

In some embodiments, a testing computer includes a non-transitory, machine-readable storage medium storing instructions, and at least one processor the non-transitory, machine-readable storage medium. Further, the at least one processor is configured to execute the instructions to transmit a delete user data message to each of a plurality of computing devices, where the delete user data message causes each of the plurality of computing devices to delete user data. The at least one processor is also configured to execute the instructions to transmit a delete operating system message to each of the plurality of computing devices, where the delete operating system message causes each of the plurality of computing devices to delete a first operating system. Further, the at least one processor is configured to execute the instructions to transmit an operating system install message to each of the plurality of computing devices, where the operating system install message causes the each of the plurality of computing devices to install a second operating system. The at least one processor may also be configured to execute the instructions to determine a status of each of the plurality of computing devices based on the install of the second operating system, and to provide the status for display.

In some embodiments, a non-transitory, machine-readable storage medium stores instructions that, when executed by at least one processor, cause the at least one processor to perform operations. The operations include transmitting a delete user data message to each of a plurality of computing devices, where the delete user data message causes each of the plurality of computing devices to delete user data. The operations also include transmitting a delete operating system message to each of the plurality of computing devices, where the delete operating system message causes each of the plurality of computing devices to delete a first operating system. Further, the operations include transmitting an operating system install message to each of the plurality of computing devices, where the operating system install message causes the each of the plurality of computing devices to install a second operating system. The operations may also include determining a status of each of the plurality of computing devices based on the install of the second operating system, and providing the status for display.

DETAILED DESCRIPTION OF THE EMBODIMENT(S)

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein may allow for the deletion of user data from multiple devices under test (DUTs) automatically, as well as for the automatic loading of software, such as firmware and/or an operating system, to the multiple DUTs. For instance, and as described herein, a testing assembly may including housing for multiple DUTs. A single testing computer (e.g., a master personal computer) is communicatively coupled to each of the multiple DUTs. For instance, each DUT may be connected through a cable, such as a universal serial bus (USB) cable (e.g., USB, USB 2.0, USB 3.0, etc.), to a hub, such as a USB hub. In addition, the testing computing device may be connected to the hub using a similar cable (e.g., USB cable). The testing computer may execute an application that causes the testing computer to generate and transmit messages over the cables and to the multiple DUTs. The messages may cause the DUTs to delete user data, to delete current software (e.g., firmware, a BIOS, an operating system), and to install new software (e.g., new firmware, a new BIOS, a new operating system). The testing computer may further carry out one or more functional tests to test the multiple DUTs. In some examples, the testing computer display results (e.g., via a graphical user interface (GUI)) that indicates success, or failure, of one or more of these operations.

Figure 1:
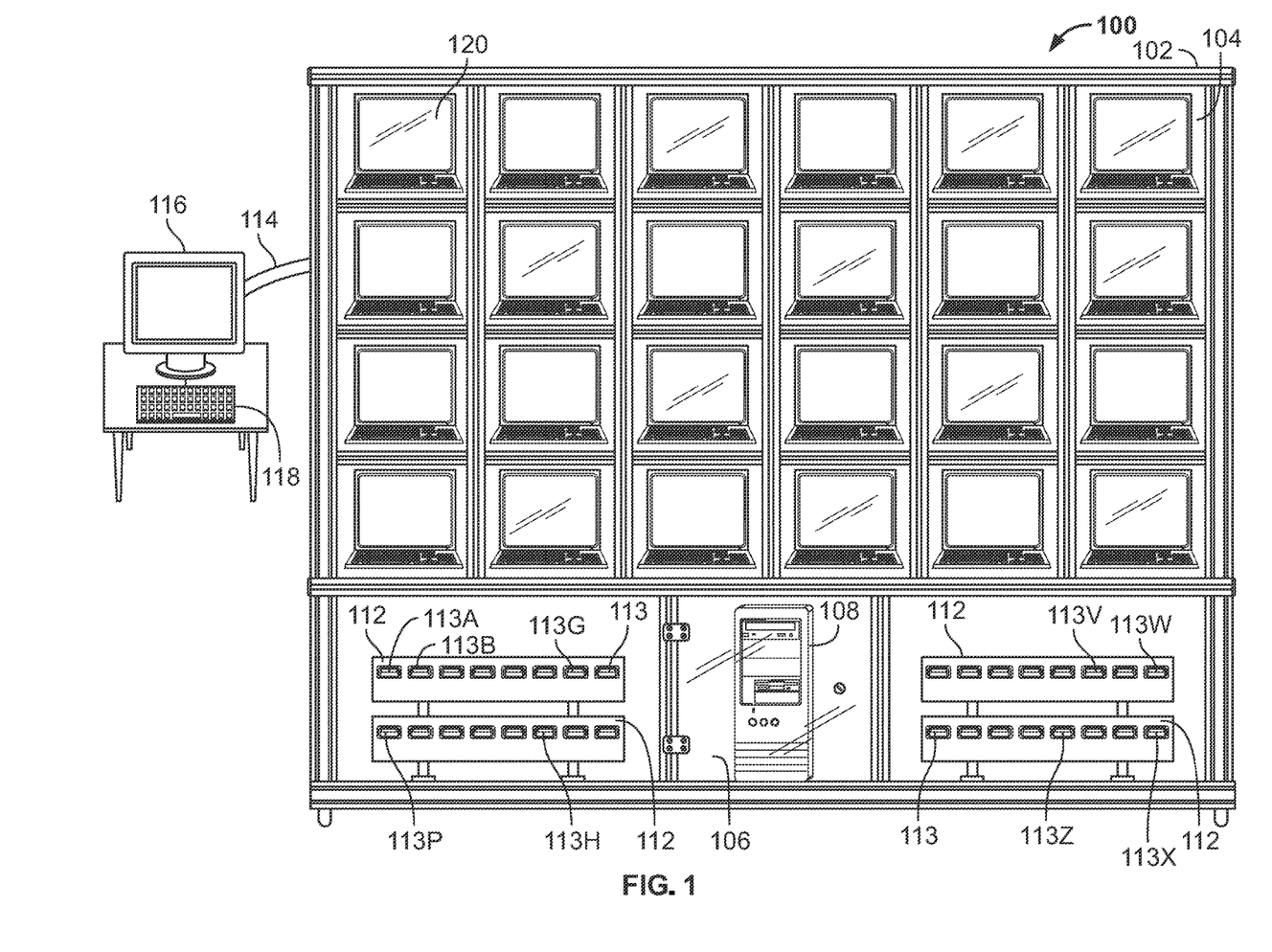
FIG. 1 illustrates a multiple computing device testing system, in accordance with some exemplary embodiments.

Referring to FIG. 1, a testing system 100 includes a testing frame 102 with a plurality of device cabinets 104, a control cabinet 106 for storing a testing computing device 108, and one or more networking cabinets 110 for holding, for example, one or more hubs 112 (e.g., USB hubs). In addition, the testing system 100 may include a bracket 114 for securing a monitor 116 and a shelf for a keyboard 118, which are communicatively coupled to the testing computing device 108. For instance, each of the monitor 116 and keyboard 118 may connect to the testing computing device 108 through a corresponding cable, such as a USB cable.

The testing frame 102 may be constructed out of a metal, such as aluminum. As illustrated, the testing frame 102 includes twenty-four device cabinets 104, where each device cabinet 104 holds a computing device 120 under test. In some examples, the testing frame 102 includes more than, or less than, twenty-four device cabinets 104. Each of the computing devices 120 under test are communicatively coupled with the testing computing device 108. For example, a USB cable may connect each of the computing devices 120 under test to one of the hubs 112 (e.g., USB hubs). In addition, a USB cable may connect the testing computing device 108 to one or more of the hubs 112, as described herein. As such, the testing computing device 108 may communicate with each of the computing devices 120 under test via one or more of the hubs 112.

Each of the computing devices 120 under test, the testing computing device 108, the hubs 112, and the monitor 116 may be connected to power. For instance, each may include a power cable connected to, for example, a power strip.

The computing devices 120 under test can include, for instance, any type of computer such as Apple® computers, Windows® computers, and Macintosh® computers, any type of laptop such as Mac® laptops and Windows® laptops, any type of tablet, or any other suitable computing device. For example, one or more of the computing devices 120 under test may be of one type of computing device, and one or more of the computing devices 120 under test may be of another type of computing device (e.g., where any one of the computer type, such as manufacturer and model, and operating system, differ from each other). Further, the testing computing device 108 may be any suitable computing device, such as a Windows® computer that includes one or more ports, such as USB ports, to communicate with hubs 112.

In some instances, testing computing device 108 maintains within memory (e.g., an internal memory device, a cloud-based storage device, etc.) a DUT table that maps each of the computing devices 120 under test to a hub 112 port 113. For instance, the DUT table may map a first computing device 120 to a first port 113A of a hub 112, and a second computing device 120 to a second port 113B of the hub 112. Furthermore, a first cable may connect the first computing device 120 to the first port 113A of the hub 112, and a second cable may connect the second computing device 120 to the second port 113B of the hub 112. As such, each computing device 120 under test is associated with a particular port number of a hub 112, and is recognized by testing computing device 108 based on the port number identified within the DUT table. In some examples, the DUT table maps each of the computing devices 120 under test to a network address, such as a network address corresponding to a USB cable connected to a corresponding port 113 of hub 112, where the USB cable is also connected to a particular computing device 120 under test. As such, each computing device 120 under test is associated with a particular network address (e.g., IP address), and is recognized by testing computing device 108 based on the network address identified within the DUT table.

The testing computing device 108 may execute instructions (e.g., an application) to perform one or more of the operations described herein. For example, testing computer device 120 may generate, for each of the computing devices 120 under test, a device request message. Testing computer device 120 may transmit the device data request message to each of the computing devices 120 under test (e.g., simultaneously using multiple cables, or sequentially using a same cable). When received by a computing device 120, the device data request message causes the computing device 120 to generate and transmit device data (e.g., within device data response messages) to testing computing device 108. Device data may include, among other things, one or more of a device type, a model number, a serial number, name of an operating system, and a year of manufacturer. For instance, and in response to receiving a device request message, a computing device 120 under test may transmit a device response message that includes the device data.

In some examples, testing computer device 120 may generate, for each of the computing devices 120 under test, a delete user data message. Testing computer device 120 may transmit the delete user data message to each of the computing devices 120 under test (e.g., simultaneously using multiple cables, or sequentially using a same cable). When received by a computing device 120, the delete user data message causes the computing device 120 to delete user data, such as user data stored within one or more memory devices of the computing device 120. For instance, and in response to receiving a delete user data message, a computing device 120 under test may delete all user data stored within a local disk (e.g., Local Disk (C:)>Users). In some instances, the computing device 120 under test generates and transmits to testing computing device 108 a delete user data status message indicating a status of the deletion operations. For instance, if the computing device successfully deleted all user data, the delete user data status message may indicate a status of "success." If, however, the computing device 120 was not able to successfully delete all of the user data, the delete user data status message may indicate a status of "failure."

In some examples, testing computer device 120 may generate, for each of the computing devices 120 under test, a delete operating system (OS) message. Testing computer device 120 may transmit the delete OS message to each of the computing devices 120 under test (e.g., simultaneously using multiple cables, or sequentially using a same cable). When received by a computing device 120, the delete OS message causes the computing device 120 to delete an operating system, such as the current operating system stored within one or more memory devices of the computing device 120. For instance, and in response to receiving a delete OS message, a computing device 120 under test may delete an operating system stored within a local disk (e.g., a startup disk). In some instances, the computing device 120 under test generates and transmits to testing computing device 108 a delete OS status message indicating a status of the deletion operations. For instance, if the computing device successfully deleted its operating system, the delete OS status message may indicate a status of "success." If, however, the computing device 120 was not able to successfully delete its operating system, the delete OS status message may indicate a status of "failure."

In some examples, testing computer device 120 may generate, for each of the computing devices 120 under test, an install operating system (OS) message. Testing computer device 120 may transmit the install OS message to each of the computing devices 120 under test (e.g., simultaneously using multiple cables, or sequentially using a same cable). When received by a computing device 120, the install OS message causes the computing device 120 to install an operating system, such as an updated, or different, operating system. In some instances, the install OS message includes all, or portions of, the OS to install. In some instances, all or portions of the OS to install are transmitted to the computing device 120 within OS data messages (e.g., message that includes all, or portions of, the OS to install) following the initial install OS message. For instance, and in response to receiving an install OS message, a computing device 120 under test may install (e.g., load) the corresponding operating system within a local disk (e.g., a startup disk). In some instances, the computing device 120 under test generates and transmits to testing computing device 108 an install OS status message indicating a status of the install operations. For instance, if the computing device successfully installs the received operating system, the install OS status message may indicate a status of "success." If, however, the computing device 120 was not able to successfully install the received operating system, the install OS status message may indicate a status of "failure."

Each of the device request messages, delete user data messages, delete OS messages, and install OS messages may be generated to correspond to a protocol supported by a particular computing device 120 under test. In addition, although described with respect to installing operating systems, in some examples, other types of software may be installed using the mechanisms described herein. For example, existing firmware, such as an existing BIOS, may be deleted, and new firmware, such as a new BIOS, may be installed.

In some instances, testing computing device 108 generates and displays a graphical user interface (GUI) on monitor 116 that allows a user to initiate one or more of the operations described herein for the plurality of computing devices 120 under test. For instance, the GUI may allow the user to select one or more of the operations described herein, and may also allow the user to select one or more of the computing devices 120 under test for which to perform the operations. As described herein, the GUI may recognize each of the computing devices 120 under test based on the DUT table. Upon engaging a "start" icon (e.g., based on an input from the keyboard 118 selecting the "start icon"), testing computing device 108 automatically carries out the enabled operations for the selected computing devices 120 under test.

In some examples, the computing devices 120 under test may take differing amounts of time to perform operations. For example, one or more computing devices 120 under test may perform a first type of operation (e.g., user data deletion, operating system deletion, and operating system install, etc.) during a timeframe, and one or more other computing devices 120 under test may perform a second type of operation during the same timeframe. In some examples, testing computing device 108 causes one or more computing devices 120 under test of a first type (e.g., Windows® computers) to initiate a first operation (e.g., initiate test mode) during a timeframe, and causes one or more computing devices 120 under test of a second type (e.g., Mac® computers) to initiate a second operation (e.g., install operating system) during the same timeframe.

In some examples, testing computing device 108 provides for display a status of each of the computing devices 120 under test. For instance, testing computing device 108 may provide for display a status of one or more of the user data deletion, the OS deletion, and the OS install operations. Testing computing device 108 may cause the status to be displayed, for instance, within the GUI on monitor 116.

In some instances, a computing device 120 under test must first be placed in a "test" mode that allows for one or more of the operations described herein, such as user data deletion, operating system deletion, and operating system install, among others. In some examples, a computing device 120 under test is placed into the "test" mode by engaging a particular key combination as the computing device 120 starts up. In other examples, testing computing device 108 generates and transmits to a computing device 120 under test a test mode message that places the computing device 120 under test in the test mode.

In some examples, a testing system, such as testing system 100, includes a testing frame, such as testing frame 102, with a plurality of device cabinets, such as device cabinets 104. The testing system further includes a computing device under test, such as a computing device 120, in each of the plurality of cabinets. Further, a control cabinet of the testing frame includes a testing computing device communicatively coupled, through one or more hubs located in networking cabinets of the testing frame, to each of the plurality of computing devices under test. For instance, control cabinet 106 of testing frame 102 may include testing computing device 108, where the testing computing device 108 is communicatively coupled to each of the plurality of computing devices 120 through one or more hubs 112 (e.g., USB hubs). The hubs 112 may be located in one or more networking cabinets 110. The testing frame may also include a bracket that secures a monitor and a keyboard, where the monitor and keyboard are communicatively coupled to the testing computing device. For example, testing frame 102 may include a bracket 114 that secures monitor 116 and keyboard 118 (e.g., via a shelving), where monitor 116 and keyboard 118 are communicatively coupled, either wired or wireless, to testing computing device 108.

Figure 2:
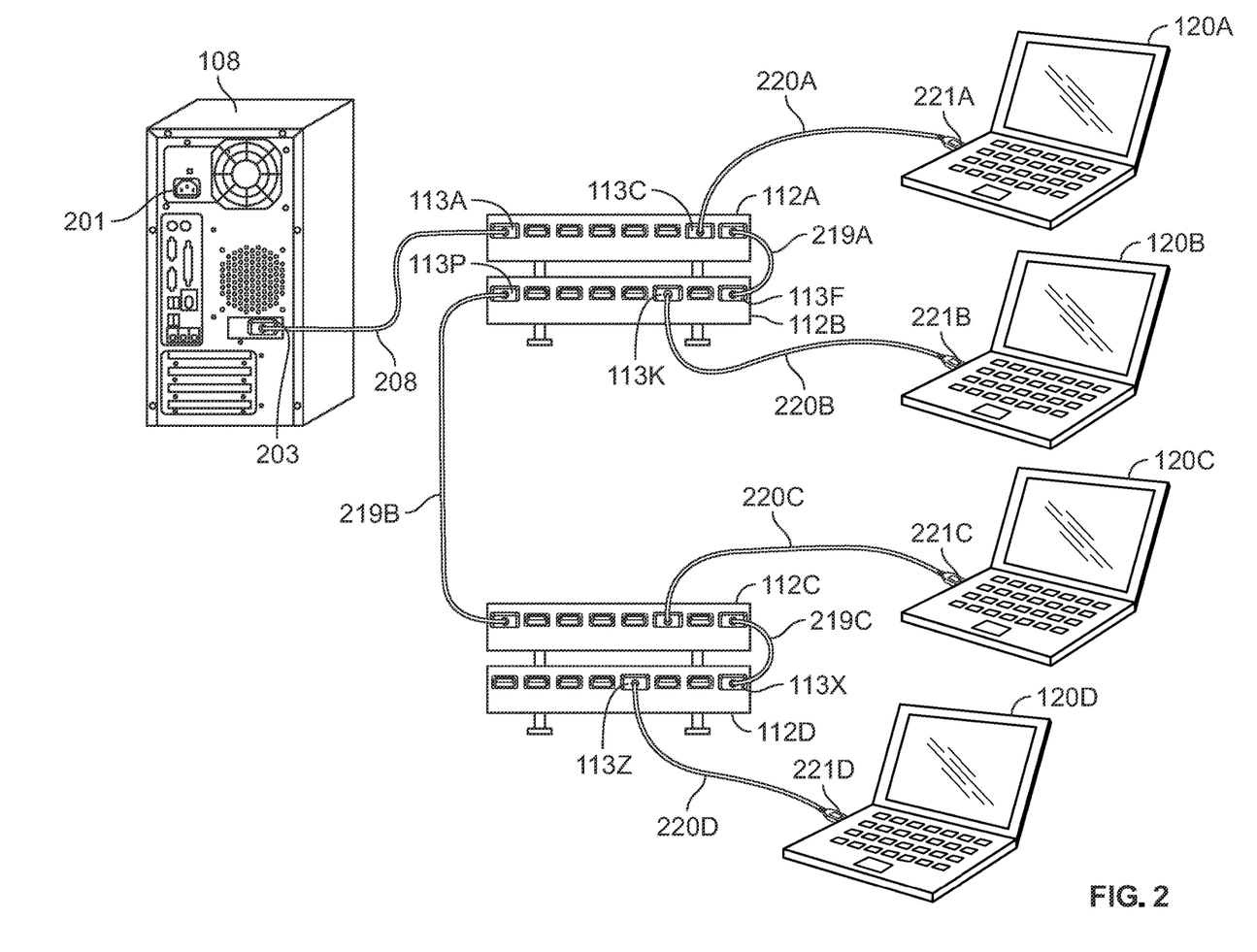
FIG. 2 illustrates exemplary portions of the multiple computing device testing system of FIG. 1, in accordance with some exemplary embodiments.

FIG. 2 illustrates exemplary portions of the testing system 100 of FIG. 1 and, in particular, communication links between testing computing device 108 and computing devices 120A, 120B, 120C, 120D under test. As illustrated, testing computing device 108 includes a power port 201 that supplies power (cable to power supply not shown for simplicity reasons), and a USB port 203. A first USB cable 208 connects the USB port 203 to a USB port 113A of USB hub 112A. This example includes four USB hubs 112A, 112B, 112C, 112D with eight USB ports each. The four USB hubs 112A, 112B, 112C, 112D are connected to each other with USB cables. Specifically, USB cable 219A connects USB port 113H of USB hub 112A to USB port 113I of USB hub 112B. In addition, USB cable 219B connects USB port 113P of USB hub 112B to USB port 113Q of USB hub 112C, and USB cable 219C connects USB port 113W of USB hub 112C to USB port 113X of USB hub 112D. As such, testing computing device 108 is communicatively coupled to each of the USB hubs 112A, 112B, 112C, 112D through one or more of USB cables 208, 219A, 219B, 219C.

Further, USB cable 220A connects USB port 221A of computing device 120A to USB port 113G of USB hub 112A. In addition, USB cable 220B connects USB port 221B of computing device 120B to USB port 113K of USB hub 112B, and USB cable 220C connects USB port 221C of computing device 120C to USB port 113K of USB hub 112B. Further, USB cable 220D connects USB port 221D of computing device 120D to USB port 113Z of USB hub 112D.

As described herein, testing computing device 108 may maintain a DUT table that maps each of computing devices 120A, 120B, 120C, 120D under test to, for instance, a port number of one of USB hubs 112A, 112B, 112C, 112D. For example, the DUT table may map computing device 120A to USB port 113G of USB hub 112A. Similarly, the DUT table may map computing device 120B to USB port 113K of USB hub 112B, computing device 120C to USB port 113V of USB hub 112C, and computing device 120D to port 113 of USB hub 112D. As such, regardless of what computing device 120A, 120B, 120C, 120D is connected to a particular USB port, testing computing device 108 would identify the computing device 120 connected to the particular USB port as the computing device 120 mapped to that particular USB port based on the DUT table.

In some examples, the DUT table, additionally or alternatively, maps each of computing devices 120A, 120B, 120C, 120D to a network address associated with each corresponding USB cable 220A, 220B, 220C, 220D. For instance, each USB cable 220A, 220B, 220C, 220D may include a corresponding network address (e.g., IP address). The DUT table may map, for instance, the network address of USB cable 220A to computing device 120A. As such, regardless of what computing device 120A, 120B, 120C, 120D is connected to USB cable 220A, testing computing device 108 would identify the computing device 120 connected to USB cable 220A as computing device 120A. Similarly, the DUT table may map the network address of USB cable 220B to computing device 120B, the network address of USB cable 220C to computing device 120C, and the network address of USB cable 220D to computing device 120D.

In some examples, testing computing device 108 generates and transmits delete user data messages (e.g., sequentially, one after the other) to each of computing devices 120A, 120B, 120C, 120D under test. For instance, and based on the DUT table that maps each of the computing devices 120A, 120B, 120C, 120D to a USB port of one of USB hubs 112A, 112B, 112C, 112D, testing computing device 108 may generate and transmit a delete user data message that identifies USB port 113G of USB hub 112A to have computing device 120A delete its user data. Similarly, testing computing device 108 may generate and transmit a delete user data message that identifies USB port 113K of USB hub 112B to have computing device 120B delete its user data. Additionally, testing computing device 108 may generate and transmit a delete user data message that identifies USB port 113V of USB hub 112C to have computing device 120C delete its user data. Further, testing computing device 108 may generate and transmit a delete user data message that identifies USB port 113Z of USB hub 112D to have computing device 120D delete its user data. Likewise, and based on the DUT table that maps each of the computing devices 120A, 120B, 120C, 120D to a USB port of one of USB hubs 112A, 112B, 112C, 112D, testing computing device 108 may generate and transmit delete OS messages, and install OS messages, to each of the computing devices 120B, 120C, 120D.

In examples when the DUT table that maps each of the computing devices 120A, 120B, 120C, 120D to a network address of one of USB cables 220A, 220B, 220C, 220D, testing computing device 108 may generate and transmit a delete user data message that identifies the network address of USB cable 220A to have computing device 120A delete its user data. Similarly, testing computing device 108 may generate and transmit a delete user data message that identifies the network address of USB cable 220B to have computing device 120B delete its user data. Additionally, testing computing device 108 may generate and transmit a delete user data message that identifies the network address of USB cable 220C to have computing device 120C delete its user data. Further, testing computing device 108 may generate and transmit a delete user data message that identifies the network address of USB cable 220D to have computing device 120D delete its user data. Likewise, and based on the DUT table that maps each of the computing devices 120A, 120B, 120C, 120D to a network address of one of USB cables 220A, 220B, 220C, 220D, testing computing device 108 may generate and transmit delete OS messages, and install OS messages, to each of the computing devices 120B, 120C, 120D.

In some examples, testing computing device 108 performs additional operations, such as functional tests, on each of the computing devices 120A, 120B, 120C, 120D. These functional tests may include testing of various components of each of the computing devices 120A, 120B, 120C, 120D, and may be performed, for example, a after a new operating system is installed. For example, testing computing device 108 may perform operations to test a battery of each of the computing devices 120A, 120B, 120C, 120D. For instance, testing computing device 108 may perform operations to test that each of the computing devices 120A, 120B, 120C, 120D is powered on, and that their battery is charging (e.g., when plugged to a power source). Further, testing computing device 108 may perform operations to test ports, such as USB ports, of each of the computing devices 120A, 120B, 120C, 120D, as well as their wireless capability (e.g., WiFi® and/or Bluetooth® capability). In some examples, testing computing device 108 may perform functional testing of the computing devices 120A, 120B, 120C, 120D that includes one or more of motherboard functionality, testing of input/output (I/O) ports used to communicate with the testing computing device 108, testing of the battery including charging capability, and testing of a Wi-fi connection.

Figure 3:
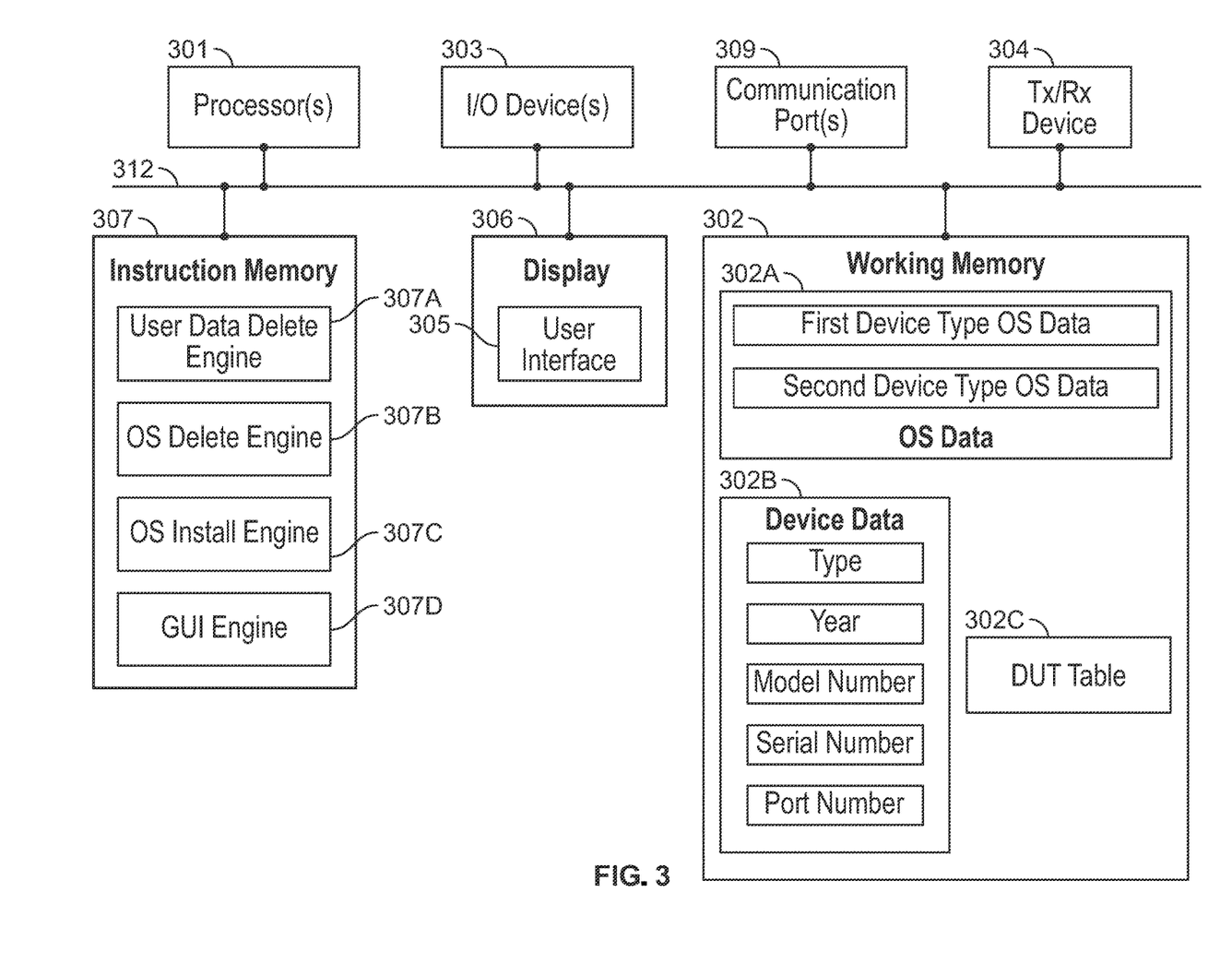
FIG. 3 illustrates a block diagram of a testing computer, in accordance with some embodiments.

FIG. 3 illustrates an example of the testing computing device 108 of FIGS. 1 and 2. Testing computing device 108 can include one or more processors 301, working memory 302, one or more input-output devices 303, instruction memory 307, a transceiver 304, one or more communication ports 309, and a display 306, all operatively coupled to one or more data buses 312. Data buses 312 allow for communication among the various devices, and can include wired, or wireless, communication channels.

Processors 301 can include one or more distinct processors, each having one or more cores. Each of the distinct processors can have the same or different structure. For example, processors 301 can include one or more central processing units (CPUs), one or more graphics processing units (GPUs), one or more application specific integrated circuits (ASICs), one or more digital signal processors (DSPs), and the like. Further, processors 301 can be configured to perform a certain function or operation by executing code, stored on instruction memory 307, embodying the function or operation. For example, processors 301 can be configured to perform one or more of any function, method, or operation disclosed herein.

Instruction memory 307 can store instructions that can be accessed (e.g., read) and executed by one or more processors 301. For example, instruction memory 307 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. In this example, instruction memory 307 includes user data delete engine 307A, OS delete engine 307B, IS install engine 307C, and a GUI engine 307D.

User data delete engine 307A may include instructions that, when executed by one or more of processors 301, cause processors 301 to perform operations to generate and transmit delete user data messages to computing devices 120 as described herein. Further, OS delete engine 307B may include instructions that, when executed by one or more of processors 301, cause processors 301 to perform operations to generate and transmit delete OS messages to computing devices 120 as described herein. OS install engine 307C may include instructions that, when executed by one or more of processors 301, cause processors 301 to perform operations to generate and transmit install OS messages to computing devices 120 as described herein. In addition, GUI engine 307D include instructions that, when executed by one or more of processors 301, cause processors 301 to perform operations to generate a GUI, and to display the GUI on monitor 116. As described herein, the executed GUI may allow a user to select operations to be perform on one or more computing devices 120, as well as to view status of the one or more computing devices 120.

Additionally, processors 301 can store data to, and read data from, working memory 302. For example, processors 301 can store a working set of instructions to working memory 302, such as instructions loaded from instruction memory 307. Processors 301 can also use working memory 302 to store dynamic data created during the operation of testing computing device 108. Working memory 302 can be a random access memory (RAM) such as a static random access memory (SRAM) or dynamic random access memory (DRAM), or any other suitable memory.

As illustrated, in this example working memory 302 includes OS data 302A, device data 302B, and DUT table 302C. OS data 302A may include data characterizing one or more operating systems, such as an operating system to be installed on computing devices 120 under test. For instance, OS data 302A may include first device type OS data, such as a WindowsR operating system for Windows-based computing devices 120, and second device type OS data, such as data characterizing MacOS® for Mac® laptops. Device data 302B may include device data for computing devices 120, such as device data received within device data response messages, as described herein. Device data 302B may include, for each computing device 120, one or more of a device type (e.g., personal computer, laptop, tablet, etc.), a model number, a serial number, and a year of manufacturer, among any other device identifying information. DUT table 302C may include data that maps computing devices 120 to a port (e.g., a USB port, such as USB port 113A of USB hub 112A). In some instances, DUT table 302C includes data that maps computing devices to network addresses, such as network addresses of USB cables 220A, 220B, 220C, 220D.

Input-output devices 303 can include any suitable device that allows for data input or output. For example, input-output devices 303 can include one or more of a keyboard, a touchpad, a mouse, a stylus, a touchscreen, a physical button, a microphone, or any other suitable input or output device.

Communication port(s) 309 can include, for example, a serial port such as a Universal Serial Bus (USB) port, an Ethernet port, a universal asynchronous receiver/transmitter (UART) port, or any other suitable communication port or connection. In some examples, communication port(s) 309 allows for the programming of executable instructions in instruction memory 307. In some examples, communication port(s) 309 allow for the transfer (e.g., uploading or downloading) of data, such as data stored within working memory 302.

Display 306 can display user interface 305. User interfaces 305 can enable user interaction with testing computing device 108. For example, user interface 205 can be a user interface for an application that allows the user to enable one or more operations, and to select one or more computing devices 120 under test, as described herein. In some examples, a user can interact with user interface 305 by engaging input-output devices 303. In some examples, display 306 can be a touchscreen, where user interface 305 is displayed on the touchscreen.

Transceiver 304 allows for communication with a network, such as a wireless communication network (e.g., WiFi®, Bluetooth®, etc.). One or more processors 301 are operable to receive data from, and send data to, a wireless network via transceiver 304.

Figure 4:
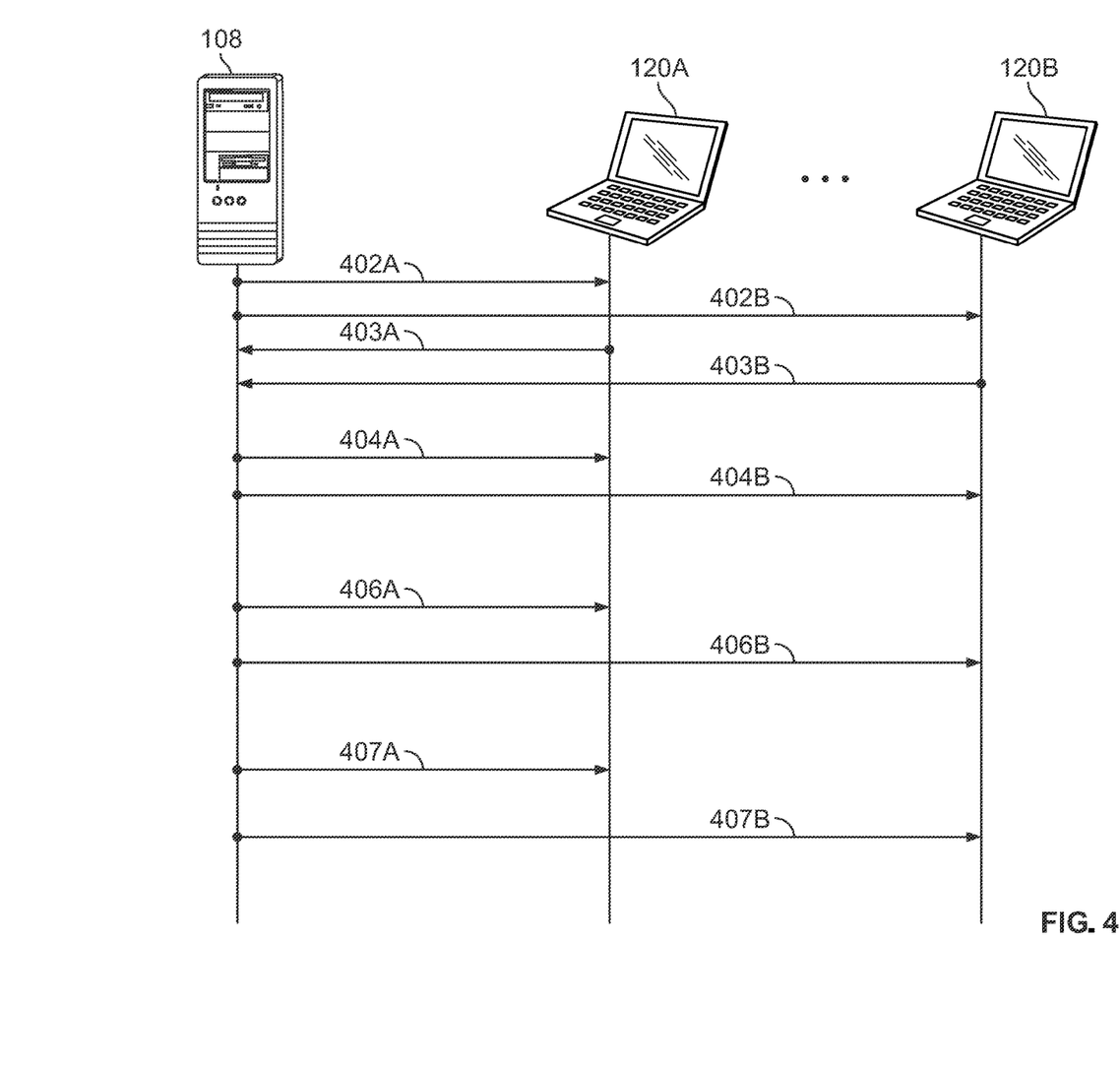
FIG. 4 illustrates messaging among device of the multiple computing device testing system of FIG. 1, in accordance with some embodiments.

FIG. 4 illustrates messaging between testing computing device 108 and computing devices 120A, 120B under test. Although messaging is illustrated and described with respect to two computing devices 120A, 120B for simplicity reasons, a person of ordinary skill in the art would recognize that the messaging can include any suitable number (e.g., twenty-four) of computing devices 120 under test.

As illustrated, testing computing device 108 may generate and transmit device data request messages 402A, 402B that, when received by computing devices 120A, 120B, respectively, cause computing devices 120A, 120B to generate device data response messages 403A, 403B. As described herein, each of device data response messages 403A, 403B may include device data for the corresponding computing device 120A, 120B. Computing devices 120A, 120B may transmit the device data response messages to testing computing device 108. Testing computing device 109 may extract the device data from each of the device data response messages 403A, 403B, and may store the extracted device data with working memory 302 (e.g., as device data 302B).

Testing computing device 108 may also generate and transmit delete user data messages 404A, 404B that, when received by computing devices 120A, 120B, respectively, cause computing devices 120A, 120B to delete user data stored within, for example, local storage devices. As described herein, in some examples, each of computing devices 120A, 120B may generate and transmit to testing computing device 108 delete user data status messages 405A, 405B, respectively, based on whether deletion of the user data was successful.

Further, testing computing device 108 may also generate and transmit delete OS messages 406A, 406B that, when received by computing devices 120A, 120B, respectively, cause computing devices 120A, 120B to delete an operating system stored within, for example, local storage devices. As described herein, in some examples, each of computing devices 120A, 120B may generate and transmit to testing computing device 108 delete OS status messages 407A, 407B, respectively, based on whether deletion of the operating system was successful.

Additionally, testing computing device 108 may generate and transmit install OS messages 408A, 408B that, when received by computing devices 120A, 120B, respectively, cause computing devices 120A, 120B to install an operating system within, for example, local storage devices. In some instances, each of the install OS messages 408A, 408B include data characterizing the operating system to install. In some instances, testing computing device 108 may transmit OS data messages, where each OS data message includes at least a portion of the data characterizing the operating system to install. Testing computing device 108 may transmit a number of OS data messages until all of the data for the operating system has been transmitted. As described herein, in some examples, each of computing devices 120A, 120B may generate and transmit to testing computing device 108 install OS status messages 409A, 409B, respectively, based on whether deletion of the operating system was successful.

In some instances, after an operating system is installed, a computing device 120 under test may execute a setup assistant application. For instance, the computing device 120 may display a graphical user interface that, initially, displays a "welcome" screen, and walks the user through various settings, such as language, time, and other preference settings. In some instances, after an operating system is installed, a computing device 120 under test (e.g., a MacOS® laptop) may provide a WiFi® accessible recovery page, which may prompt the user to select a WiFi® network for recovery. For instance, and depending on a model of a computing device 120 under test, some models may be updated to a "welcome" screen, while some models require an operator to initiate an "O/S recovery" via a Wi-Fi recovery page.

Figure 5:
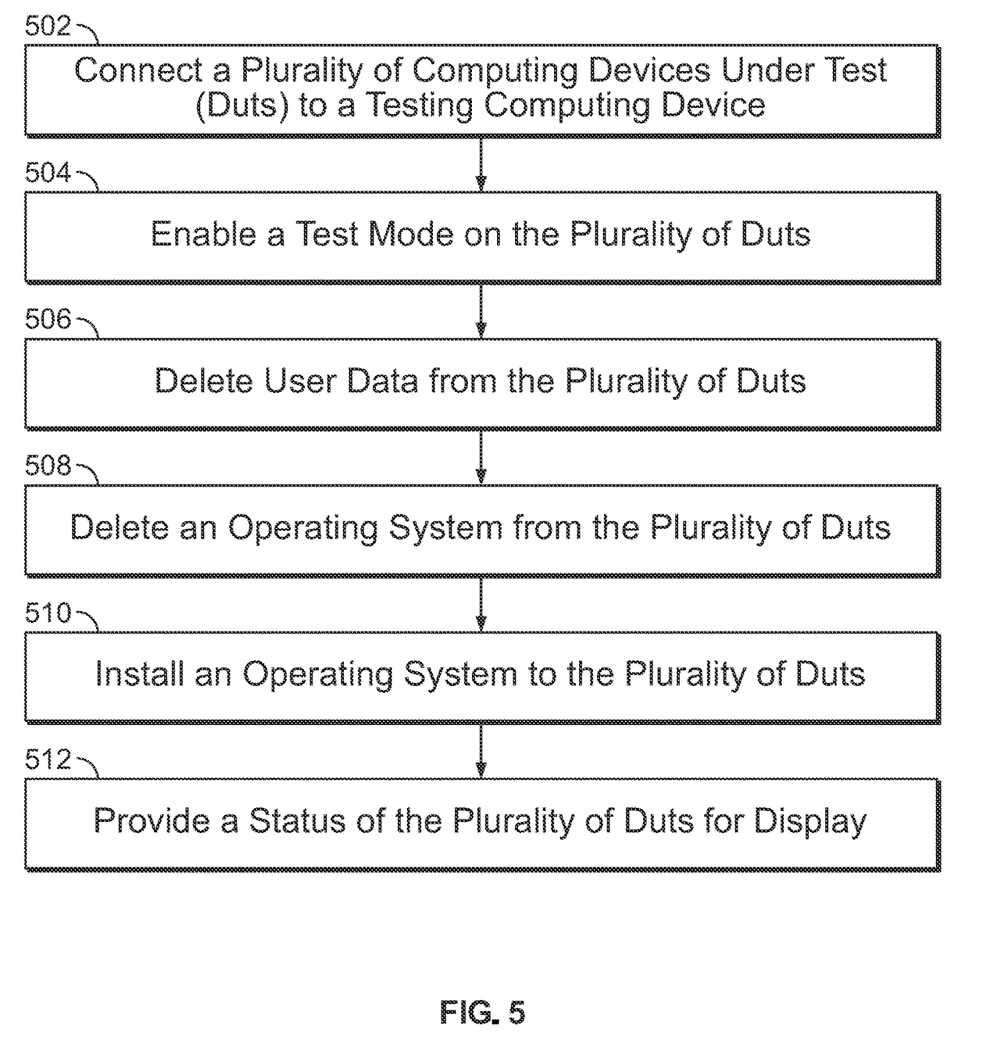
FIG. 5 is a flowchart of an exemplary process for deleting data and installing software on a plurality of computing devices, in accordance with some embodiments.

FIG. 5 is a flowchart of an exemplary process 500 to simultaneously service a plurality of computing devices under test. Beginning at step 502, a plurality of computing devices under test are communicatively coupled to a testing computing device. For example, a plurality of computing devices 120 under test may be positioned within corresponding device cabinets 104 of testing frame 102. Further, cables, such as USB cables, may connect each of the plurality of computing devices 120 to a hub, such as hub 112. Additionally, another cable, such as USB cable 208, may connect testing computing device 108 to the hub 112.

At step 504, a "test mode" is enabled on the plurality of computing devices under test. For instance, a user may enable "test mode" on each of the plurality of computing devices 120. For instance, the "test mode" may be enabled by powering up each of the plurality of computing devices 120 while engaging (e.g., holding down) a particular key combination on a corresponding keyboard. In some instances, the testing computing device 108 may generate and transmit a test mode message to each computing device, where the test mode message causes the receiving computing device 120 to be placed in the test mode.

Proceeding to step 506, user data is deleted from the plurality of computing devices under test. For example, testing computing device 108 may generate, for each of the plurality of computing devices 120, a delete user data message, such as delete user data message 404A, that when received by a computing device 120, causes the computing device 120 to delete all user data. Testing computing device 108 may transmit the delete user data messages 404A to the plurality of computing devices 120, causing the deletion of the user data on each of the plurality of computing devices 120.

At step 508, an installed operating system is deleted from the plurality of computing devices. For example, testing computing device 108 may generate, for each of the plurality of computing devices 120, a delete OS message, such as delete OS message 406A, that when received by a computing device 120, causes the computing device 120 to delete its current operating system. Testing computing device 108 may transmit the delete OS messages 406A to the plurality of computing devices 120, causing the deletion of the operating system on each of the plurality of computing devices 120.

At step 510, an operating system is installed on each of the plurality of computing devices. For example, testing computing device 108 may generate, for each of the plurality of computing devices 120, an install OS message, such as install OS message 408A, that when received by a computing device 120, causes the computing device 120 to install an operating system. Testing computing device 108 may transmit the install OS messages 408A to the plurality of computing devices 120, causing the installation of the operating system on each of the plurality of computing devices 120.

Proceeding to step 512, a status is determined for each of the plurality of computing devices, and at step 514, the status is provided for display. The status may indicate whether any of the user data deletion, OS deletion, and OS install were successful or not. For example, and as described herein, testing computing device 108 may receive delete user data status, delete OS status, and install OS status messages from each of the plurality of computing devices 120 under test. Testing computing device 108 may provide these received status for each of the plurality of computing devices 120 for display on monitor 116.

Figure 6:
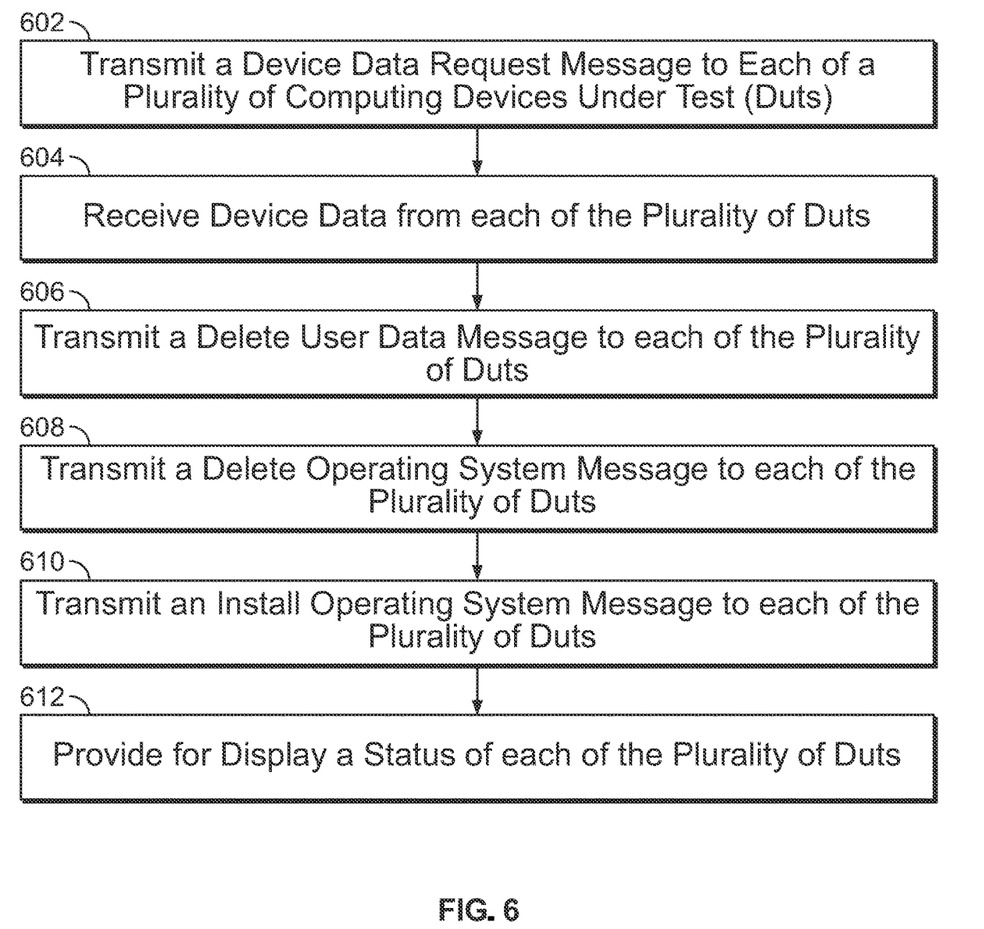
FIG. 6 is a flowchart of another exemplary process for deleting data and installing software on a plurality of computing devices, in accordance with some embodiments.

FIG. 6 is a flowchart of an exemplary process 600 that can be carried out by, for example, testing computing device 108. Beginning at step 602, testing computing device 108 transmits a device data request message 402A to each of a plurality of computing devices 120 under test. For example, testing computing device 108 may be communicatively coupled to the plurality of computing devices 120, where each of the plurality of computing devices 120 under test are positioned within a device cabinet 104 of a testing frame 102. Testing computing device 108 may generate and transmit a device data OS request message to each of the plurality of computing devices 120 based on a DUT table, such as DUT table 302C, that maps the plurality of computing devices 120 to a port or, in some examples, a network address.

In response to the device request messages, at step 604, testing computing device 108 receives, from each of the plurality of computing devices 120, device data. For instance, testing computing device 108 may receive a device data response message 403A that includes the device data for each of the plurality of computing devices 120 under test.

Proceeding to step 606, testing computing device 108 transmits a delete user data message 404A to each of the plurality of computing devices 120 under test (e.g., based on the DUT table). In response, each of the plurality of computing devices 120 may attempt to delete user data. In some examples, the plurality of computing devices 120 may transmit to the testing computing device 108 a status based on whether the deletion of user data was successful.

At step 608, testing computing device 108 transmits a delete OS message 406A to each of the plurality of computing devices 120 under test (e.g., based on the DUT table). In response, each of the plurality of computing devices 120 may attempt to delete their corresponding operating system. In some examples, the plurality of computing devices 120 may transmit to the testing computing device 108 a status based on whether the deletion of their operating system was successful.

Further, and at step 610, testing computing device 108 transmits an install OS message 408A to each of the plurality of computing devices 120 under test (e.g., based on the DUT table). The install OS message 408A, and in some examples, one or more following OS data messages, may include data characterizing the operating system. In response, each of the plurality of computing devices 120 may attempt to install the received operating system. In some examples, the plurality of computing devices 120 may transmit to the testing computing device 108 a status based on whether the installation of the operating system was successful.

At step 612, the testing computing device 108 provides for display (e.g., on monitor 116) a status for each of the plurality of computing devices 120 under test. For example, and as described herein, testing computing device 108 may receive delete user data status, delete OS status, and install OS status messages from each of the plurality of computing devices 120 under test. Testing computing device 108 may provide these received status for each of the plurality of computing devices 120 for display on monitor 116.

Advantageously, the embodiments described herein allow for simultaneously clearing data from, and loading software to, a plurality of computing devices, such as computers and laptops. The embodiments may also allow for simultaneously performing one or more functional tests on the plurality of computing devices. Among other benefits, updating and testing efficiency of computing devices is increased, thereby saving time and decreasing costs.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed:

1. A method by a testing computing device comprising at least one processor, the method comprising:
transmitting a delete user data message to each of a plurality of computing devices positioned in one of a plurality of cabinets of a testing frame, wherein the delete user data message causes each of the plurality of computing devices to delete user data;
transmitting a delete operating system message to each of the plurality of computing devices, wherein the delete operating system message causes each of the plurality of computing devices to delete a first operating system;
transmitting an install operating system message to each of the plurality of computing devices, wherein the install operating system message causes each of the plurality of computing devices to install a second operating system;
transmitting, to each of the plurality of computing devices, a device data request message; and
receiving, from each of the plurality of computing devices in response to the device data request message, a device data response message comprising device data, the device data comprising a device type, a model number, a serial number, a name of an operating system, and a year of manufacture.

2. The method of claim 1, comprising identifying each of the plurality of computing devices based on data stored in a memory device that maps each of the plurality of computing devices to a corresponding port of at least one hub.

3. The method of claim 1, comprising identifying each of the plurality of computing devices based on data stored in a memory device that maps each of the plurality of computing devices to a network address of a corresponding cable.

4. The method of claim 1, comprising:
receiving, in response to transmitting the delete user data message to each of the plurality of computing devices, a delete user data status message from each of the plurality of computing devices, the delete user data status message characterizing a first status based on the deletion of the user data;

receiving, in response to transmitting the delete operating system message to each of the plurality of computing devices, a delete operating system status message from each of the plurality of computing devices, the delete operating system status message characterizing a second status based on the deletion of the operating system;

receiving, in response to transmitting the install operating system data message to each of the plurality of computing devices, an install operating system status message from each of the plurality of computing devices, the install operating system status message characterizing a third status based on the installation of the operating system; and for each of the plurality of computing devices, providing for display at least one of the first status, the second status, and the third status.

5. The method of claim 1, wherein one or more of the plurality of computing devices under test are of a first type, and one or more of the plurality of computing devices under test are of a second type, the method comprising causing the one or more of the plurality of computing devices under test of the first type to perform a first operation during a timeframe, and causing the one or more of the plurality of computing devices under test of the second type to perform a second operation during the timeframe.

6. An apparatus comprising:
a non-transitory, machine-readable storage medium storing instructions; and
at least one processor communicatively coupled to the non-transitory, machine-readable storage medium, the at least one processor being configured to execute the instructions to:
transmit a delete user data message to each of a plurality of computing devices positioned in a corresponding one of a plurality of cabinets of a testing frame, wherein the delete user data message causes each of the plurality of computing devices to delete user data;
transmit a delete operating system message to each of the plurality of computing devices, wherein the delete operating system message causes each of the plurality of computing devices to delete a first operating system;
transmit an install operating system message to each of the plurality of computing devices, wherein the install operating system message causes each of the plurality of computing devices to install a second operating system;
transmit, to each of the plurality of computing devices, a device data request message; and
receive, from each of the plurality of computing devices in response to the device data request message, a device data response message comprising device data, the device data comprising a device type, a model number, a serial number, a name of an operating system, and a year of manufacture.

7. The apparatus of claim 6, wherein the at least one processor is configured to execute the instructions to identify each of the plurality of computing devices based on data stored in a memory device that maps each of the plurality of computing devices to a corresponding port of at least one hub.

8. The apparatus of claim 6, wherein the at least one processor is configured to execute the instructions to identify each of the plurality of computing devices based on data stored in a memory device that maps each of the plurality of computing devices to a network address of a corresponding cable.

9. The apparatus of claim 6, wherein the at least one processor is configured to execute the instructions to:
receive, in response to transmitting the delete user data message to each of the plurality of computing devices, a delete user data status message from each of the plurality of computing devices, the delete user data status message characterizing a first status based on the deletion of the user data;
receive, in response to transmitting the delete operating system message to each of the plurality of computing devices, a delete operating system data status message from each of the plurality of computing devices, the delete operating system message characterizing a second status based on the deletion of the operating system;
receive, in response to transmitting the install operating system data message to each of the plurality of computing devices, an install operating system status message from each of the plurality of computing devices, the install operating system status message characterizing a third status based on the installation of the operating system; and
for each of the plurality of computing devices, provide for display at least one of the first status, the second status, and the third status.

10. The apparatus of claim 6, wherein one or more of the plurality of computing devices under test are of a first type, and one or more of the plurality of computing devices under test are of a second type, wherein the at least one processor is configured to execute the instructions to cause the one or more of the plurality of computing devices under test of the first type to perform a first operation during a timeframe, and cause the one or more of the plurality of computing devices under test of the second type to perform a second operation during the timeframe.

* * * * *